(12) United States Patent
Vakili

(10) Patent No.: US 11,457,042 B1
(45) Date of Patent: Sep. 27, 2022

(54) MULTI-TIERED SYSTEM FOR DETECTING AND REDUCING UNAUTHORIZED NETWORK ACCESS

(71) Applicant: Wells Fargo Bank, N.A., San Francisco, CA (US)

(72) Inventor: Masoud Vakili, Los Altos, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 835 days.

(21) Appl. No.: 15/906,449

(22) Filed: Feb. 27, 2018

(51) Int. Cl.
*H04L 29/06* (2006.01)
*H04L 9/40* (2022.01)
*G06N 5/02* (2006.01)

(52) U.S. Cl.
CPC ............... *H04L 63/20* (2013.01); *G06N 5/02* (2013.01); *H04L 63/102* (2013.01); *H04L 63/1425* (2013.01)

(58) Field of Classification Search
CPC ... H04L 63/20; H04L 63/102; H04L 63/1425; G06N 5/02
See application file for complete search history.

(56) References Cited

U.S. PATENT DOCUMENTS

| | | | |
|---|---|---|---|
| 7,606,821 B2 | 10/2009 | Leahy et al. | |
| 7,787,628 B2 | 8/2010 | Kuang et al. | |
| 7,984,500 B1 * | 7/2011 | Khanna | G06F 21/60 726/22 |
| 9,083,684 B2 | 7/2015 | Tanizawa et al. | |
| 9,386,103 B2 | 7/2016 | Clifton et al. | |
| 9,680,640 B2 | 6/2017 | Hughes et al. | |
| 10,467,632 B1 * | 11/2019 | Merritt | G06Q 30/0185 |
| 10,825,028 B1 * | 11/2020 | Kramme | G06K 9/00442 |
| 2012/0278886 A1 | 11/2012 | Luna | |

(Continued)

FOREIGN PATENT DOCUMENTS

EP 2 840 542 A2 2/2015

OTHER PUBLICATIONS

Diners Club Cuts Fraud With ai Corporation [online] [retrieved Apr. 4, 2018]. Retrieved from the Internet: <URL: https://www.finextra.com/pressarticle/63846/diners-club-cuts-fraud-with-ai-corporation>. (dated Apr. 5, 2016) 3 pages.

(Continued)

*Primary Examiner* — Shin-Hon (Eric) Chen
(74) *Attorney, Agent, or Firm* — Womble Bond Dickinson (US) LLP

(57) ABSTRACT

Embodiments are disclosed for detecting and responding to potentially fraudulent transactions and other network access events via a system comprising a three-tiered network architecture. An example system comprises one or more user equipment devices configured with a thin client application (a first tier). The one or more user equipment devices are capable of communicating with a respective local authority controller and a local knowledge base (the second tier). The one or more local authority controllers and local knowledge bases are configured to interact with a master authority controller and master knowledge base (the third tier) to enable the efficient assessment of potentially localized fraudulent network activity and the passing of network access rule sets amongst the devices in each tier. Corresponding apparatuses and methods are also provided.

17 Claims, 5 Drawing Sheets

(56) References Cited

U.S. PATENT DOCUMENTS

| | | | |
|---|---|---|---|
| 2016/0048837 A1 | 2/2016 | Jin et al. | |
| 2016/0086185 A1* | 3/2016 | Adjaoute | |
| 2016/0351022 A1* | 12/2016 | Ghafoor | G06Q 20/18 |
| 2017/0032783 A1* | 2/2017 | Lord | G10L 15/22 |
| 2017/0169500 A1* | 6/2017 | Merz | G06Q 30/0631 |
| 2017/0214525 A1 | 7/2017 | Zhao et al. | |
| 2017/0374076 A1* | 12/2017 | Pierson | H04L 63/1408 |
| 2018/0054440 A1* | 2/2018 | Bercovich | G06F 21/00 |
| 2018/0196694 A1* | 7/2018 | Banerjee | G06F 9/466 |
| 2018/0357563 A1* | 12/2018 | Kurian | H04L 63/102 |
| 2019/0095919 A1* | 3/2019 | Legault | G06Q 20/4016 |
| 2019/0132353 A1* | 5/2019 | Rodniansky | H04L 63/0227 |
| 2019/0207953 A1* | 7/2019 | Klawe | G07F 7/088 |

OTHER PUBLICATIONS

Kamal, P. et al., *A Robust Authentication System Handwritten Documents Using Local Features For Writer Identification*, Journal of Computing Science and Engineering, vol. 8, No. 1 (Mar. 2014) 11-16.

\* cited by examiner

MULTI-TIERED SYSTEM FOR DETECTING AND REDUCING UNAUTHORIZED NETWORK ACCESS

TECHNOLOGICAL FIELD

Example embodiments of the present invention relate generally to the efficient detection of fraudulent network access events and use of a multi-tiered network architecture to identify, develop, and deploy targeted approaches for avoiding fraudulent network access events.

BACKGROUND

Fraudulent network access events, particularly in situations where the fraudulent activity targets financial institutions, impose significant costs in the form of lost time, lost resources, and damaged reputations on individuals, businesses, and other innocent entities. Conventional security practices and common-sense precautions are often effective at avoiding simple fraudulent attacks. However, many modern efforts to fraudulently access networks, and the entities that engage in such efforts, have become increasing complex, sophisticated, and targeted.

BRIEF SUMMARY

As individuals, businesses, and other entities have become increasingly comfortable with and reliant upon mobile computing devices that are capable of performing sophisticated operations and data exchanges over wireless networks, many network operators, including those associated with financial institutions, have responded to market demands for mechanisms that allow for a wide array of financial transactions and other network access events to be performed by mobile devices over a wide range of wired and wireless networks from almost anywhere around the planet. While these networks have proven capable of performing millions of transactions safely, securely, and accurately on a daily basis, such networks have also become a target for individuals, groups, and other entities that seek to fraudulently access financial networks to divert funds, misappropriate resources, and otherwise engage in unauthorized conduct.

Conventional systems for detecting and responding to fraudulent network activity are often effective in detecting and responding to basic, conventional fraudulent network activity and attempted activity. However, many individuals and entities have developed, and continue to develop, increasingly complex and sophisticated approaches to attacking networks and otherwise attempting to engage in fraudulent network activity.

The inventor has identified problems with existing systems used to detect and respond to fraudulent network activity that limit the efficacy of such existing fraud detection and response systems, particularly in contexts involving complex and/or otherwise sophisticated schemes that are targeted and/or otherwise specific to a relatively localized geographic area. Existing systems for detecting and responding to fraudulent network activity often take a one-size-fits-all approach, and/or otherwise fail to account for localized differences in the nature of efforts to fraudulently access or use a network. Consequently, such existing systems are not effective at detecting and addressing geographically targeted and/or otherwise localized fraudulent network access efforts and are usually slow to respond to such efforts, if they respond at all. Further, by failing to sufficiently account for differences in fraudulent network access efforts amongst different geographic areas, existing fraud detection and response systems often compound this weakness by applying fraud detection and response mechanisms that may be appropriate for certain areas (e.g., population centers) but which remain a poor match for the particular needs and threats of the fraudulent network access efforts of other areas.

Consequently, there is a need for advanced and improved systems for the detection of fraudulent network access efforts and the deployment of approaches to address such fraudulent network access efforts that are sensitive to geographical variations in network risk and that can identify geographical areas having similar risk profiles that may not otherwise be intuitively recognizable. In particular, there is a need for advanced and improved fraudulent network activity detection and response systems that are capable of efficiently identifying and responding to fraudulent network access activity that may be targeted and/or otherwise specific to a particular geographic area, and ascertaining the extent to which information regarding such localized activity should be shared and deployed across a wider geographic region. Further, there is a need for advanced and improved fraudulent network activity detection and response systems that are capable of rapidly identifying and responding to increasing volumes of complex and/or otherwise sophisticated fraudulent network access efforts, particularly in situations where such efforts tend to evolve rapidly over time and where such efforts tend to exhibit location-specific characteristics designed to exploit one or more perceived vulnerabilities in a particular geographic area.

To address the above needs and others, example embodiments are described herein for detecting and then reducing the likelihood of occurrence of unauthorized network access events. In a first example embodiment, a system having a three-tiered architecture is provided for avoiding unauthorized network access events. The example system includes a user equipment device associated with a first tier of the architecture, a local authority controller associated with a second tier of the architecture, a local knowledge base associated with the second tier of the architecture, a master authority controller associated with a third tier of the architecture, and a master knowledge base associated with the third tier of the architecture. The user equipment device comprises a thin client, the thin client configured to be in communication with the local authority controller. The local authority controller is in communication with the local knowledge base and the master authority controller. And the master authority controller is in communication with the master knowledge base.

In some embodiments, the local authority controller is configured to receive, from the thin client, a set of characteristics of a potentially fraudulent transaction detected by the thin client, determine, based at least in part on the set of characteristics of the potentially fraudulent transaction, whether to cause the transmission of the set of characteristics of the potentially fraudulent transaction to the master authority controller, and, based at least in part on the set of characteristics of the potentially fraudulent transaction, determine a network access rule set to be applied by the thin client. In some such embodiments, the local authority controller comprises an artificial intelligence system configured to analyze the set of characteristics of the potentially fraudulent transaction. Additionally or alternatively, the master authority controller comprises an artificial intelligence system configured to analyze the set of characteristics of the potentially fraudulent transaction. In this regard, the local knowledge base may be configured to store a set of characteristics of one or more fraudulent transactions associated with a predetermined geographic area. Additionally or alternatively, the master knowledge base may be configured to store a set of characteristics of one or more fraudulent transactions associated with multiple predetermined geographic regions.

In another example embodiment, a method is provided for detecting and reducing fraudulent network activity via a system arranged in a three-tiered architecture. The example method includes receiving, by escalation circuitry of an apparatus, an escalation request associated with a potentially fraudulent transaction detected by a user equipment device, determining, by monitoring circuitry of the apparatus and based at least in part on the escalation request, a response to the potentially fraudulent transaction, generating, by abatement circuitry of the apparatus, a network access rule set based on the escalation request, and causing transmission of the network access rule set to the user equipment device from a local authority controller.

In some embodiments of the method, the escalation request comprises a set of characteristics of the potentially fraudulent transaction. In some such embodiments, the network access rule set comprises a set of actions to be taken by the user equipment device based at least in part on the characteristics of the potentially fraudulent transaction. To this end, determining a response to the potentially fraudulent transaction may comprise comparing the characteristics of the potentially fraudulent transaction against one or more sets of characteristics received from a local knowledge base. Moreover, determining a response to the potentially fraudulent transaction may further comprise causing transmission, by reporting circuitry of the apparatus, of the set of characteristics of the potentially fraudulent transaction to a master authority controller. And in this regard, the method may further include a step of receiving a set of instructions from the master authority controller. And in some embodiments, causing transmission of the network access rule set to the user equipment device may include a step of incorporating, by the abatement circuitry of the apparatus, the set of instructions received from the master authority controller.

In another example embodiment, an apparatus is provided for detecting and reducing fraudulent network activity via a system arranged in a three-tiered architecture. The example apparatus includes escalation circuitry configured to receive an escalation request associated with a potentially fraudulent transaction detected by a user equipment device, monitoring circuitry configured to determine, based at least in part on the escalation request, a response to the potentially fraudulent transaction, abatement circuitry configured to generate a network access rule set based on the escalation request, and circuitry configured to cause transmission of the network access rule set to the user equipment device from a local authority controller.

In some embodiments, the escalation request comprises a set of characteristics of the potentially fraudulent transaction. To this end, the network access rule set may comprise a set of actions to be taken by the user equipment device based at least in part on the characteristics of the potentially fraudulent transaction. In one such example, determining a response to the potentially fraudulent transaction may include comparing the characteristics of the potentially fraudulent transaction against one or more sets of characteristics received from a local knowledge base. Moreover, the reporting circuitry of the apparatus may further be configured to determine the response to the potentially fraudulent transaction by causing transmission of the set of characteristics of the potentially fraudulent transaction to a master authority controller. In addition, the apparatus may further include circuitry configured to receive a set of instructions from the master authority controller. Additionally, causing transmission of the network access rule set to the user equipment device may include incorporating, by the abatement circuitry of the apparatus, the set of instructions received from the master authority controller.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale.

DETAILED DESCRIPTION

Figure 1A:
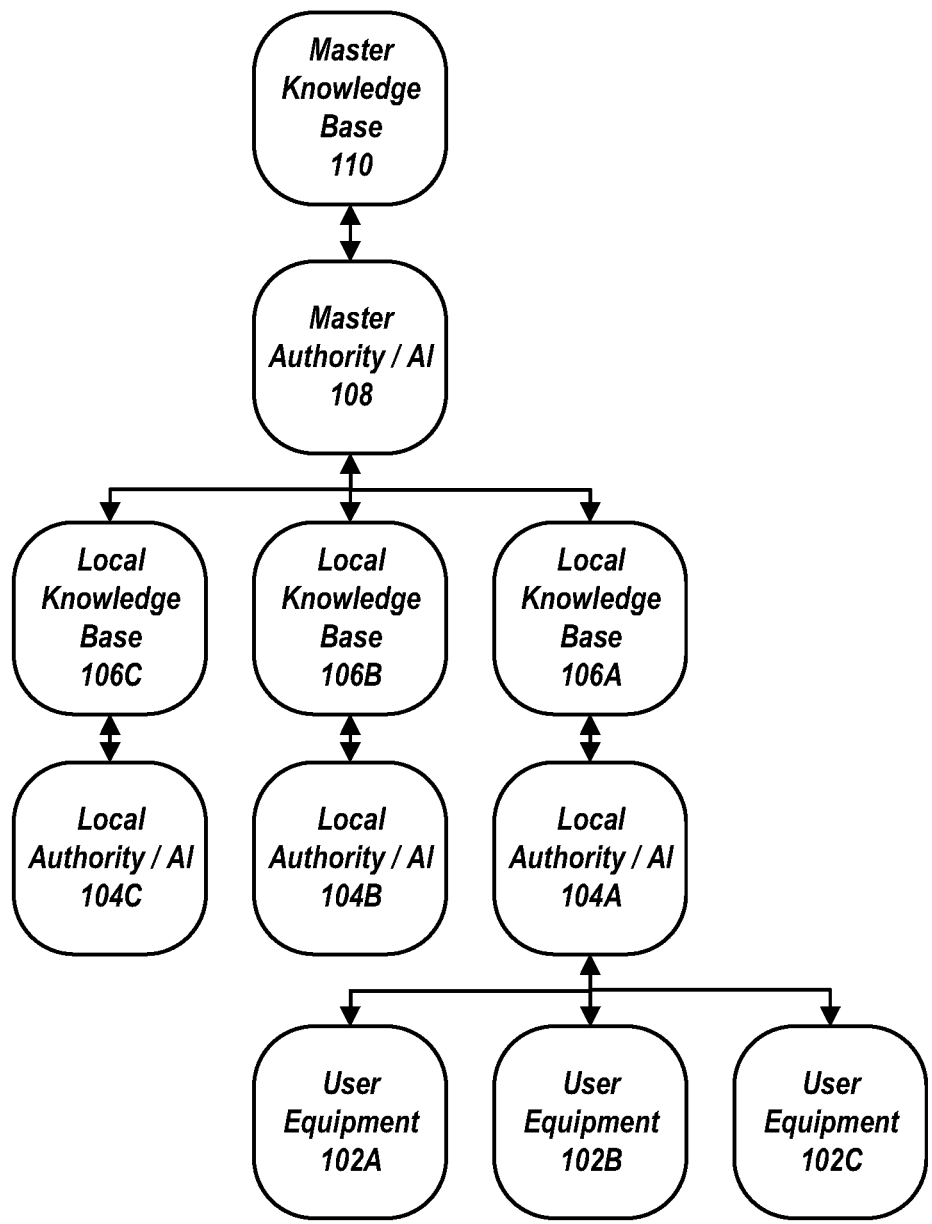
FIG. 1A illustrates a system diagram outlining an example three-tiered system architecture utilized by some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, and systems are described herein that provide solutions to the problems identified above, as well as others. In one example embodiment, a fraud-detection network architecture configured to detect and respond to fraudulent network access activity is deployed in connection with a network that processes potentially sensitive information exchanges and/or other transactions.

In some example implementations, the fraud detection network architecture takes the form of a three-tier network architecture. In such example implementations, user equipment devices, such as mobile devices, laptop and/or other computing devices, automated teller machines (ATMs) or the like are enhanced through the addition of a thin client application that is configured to communicate with one or more local fraud knowledge bases and a local authority controller. The local fraud knowledge bases harvest and store information and updates regarding local patterns of network access activity and the characteristics of local fraudulent network access efforts. In many instances, the local authority controller features an artificial intelligence (AI) system facilitating recognition of various patterns of local network activity to identify local fraudulent network access efforts.

As part of the interactions between the many user equipment devices in a particular geographic location and the corresponding local fraud knowledge base and local authority controller associated with the geographic location, the local authority controller pushes information and updates regarding local patterns in fraudulent network access activity—such a signatures, characteristics, and/or other detectable aspects of the fraudulent network access efforts that are likely in a given geographic region for example—onto the thin clients that reside on the user equipment within that geographic area. As a result, potentially fraudulent activity within the scope of the information and updates distributed by the local authority controller can be prevented and/or escalated at the user equipment level.

In some example implementations, when a transaction or other network access activity is attempted in connection with a user equipment device within the three-tiered architecture, the thin client associated with the user equipment device analyzes the transaction or other activity to detect any of the patterns, signatures, characteristics and/or other traits of fraudulent activity that have been supplied in the most recent update from the local knowledge base. In situations where the current transaction or other activity matches such patterns, signatures, characteristics, and/or other traits, the subject transaction and/or other activity is blocked and/or escalated to the local authority controller (which may be equipped with an AI system) which in turn interprets and/or otherwise processes the risk associated with the subject transaction and/or other activity. As part of this risk interpretation and/or processing, the local authority controller may interact with the local knowledge base to identify potential actions that may be necessary and/or otherwise appropriate in addressing, preventing, and/or otherwise responding to the potentially fraudulent transaction or other activity.

In some example implementations, one or more local fraud knowledge bases are maintained by a local authority controller, but are also in communication with a master fraud authority and master fraud knowledge base. Where the local fraud knowledge bases are configured to maintain information about the fraudulent network access efforts in a given geographic region (such as a zip code, city, region, or part of a state, for example), the master fraud knowledge base is configured to maintain information relevant to a wider (such as national and/or global, for example) geographic area. In some such example implementations, the master fraud knowledge base is connected to the local fraud knowledge base modules through a master authority controller (which may be configured with an AI system), which is configured to receive reports regarding fraudulent network access efforts and related activity from the local fraud knowledge bases. Based on analysis (such as analysis performed by the AI system associated with the master authority controller, for example) of transactions performed or attempted at the user equipment devices, the master authority controller updates the fraud signatures and/or other relevant information stored in the master fraud knowledge base and pushes updates to the relevant local fraud knowledge base or bases when patterns of activity suggest a likelihood that such fraud signatures may be expected in the corresponding geographical areas.

As noted herein, some example embodiments of the invention described and otherwise disclosed herein are particularly well-suited for use in environments involving a communications network. Some such environments may include a communications network used by a financial institution and/or other institution to receive and process payments, fund withdrawals, and/or other transactions. In such an environment involving a communications network used by a financial institution, many of the technical challenges described herein are compounded and exacerbated. Since the communications networks used by financial institutions and customers of those financial institutions are often designed to facilitate the purchase of goods and/or services, the transfer of funds, and even the withdrawal of funds, such networks are often targeted more frequently or in more sophisticated ways by individuals or groups who seek to misappropriate resources. As such, many of the examples presented herein use terminology and contextual description that relates to the communications networks used by financial institutions. However, it will be appreciated that example embodiments of the methods, systems, and apparatus presented herein are not limited to such contexts and environments, and may be implemented in a wide variety of system environments and contexts.

As used herein, the terms "fraudulent activity", "fraudulent network access event", "fraudulent network access activity", and "unauthorized network access event" each refer to any action, activity, and/or set of actions or activities through which an individual, entity, and/or device attempts to access a network without the consent of an authorized network user. In the context of communications networks used to interact with a payment system and/or financial institution, the fraudulent activity may encompass many different actions and/or activities, including but not limited to the use of stolen credentials (such as, for example, the use of genuine account numbers, credit cards, usernames, passwords, and/or other credentials that are stolen from a user and/or otherwise used without permission), the use of stolen user identities (such as, for example, the unauthorized use of biographical, personal, and/or other identification information to obtain credit accounts and/or other network access credentials), the use of synthetic identities (such as the creation of a fictitious person or entity for the purposes of acquiring accounts and/or other network access credentials), and/or the use of hijacked and/or otherwise compromised devices (such as the use of malware and/or other efforts to gain access to and control over and legitimate user's mobile device and/or other computing device).

As used herein, the terms "local area" and "local geographic region" and the like refer to any geographic area that can be identified with a closed boundary. Examples of bounded geographic regions include, but are not limited to, a state, city, zip code, closed set of identified city blocks, set of streets and/or other boundaries that define a closed area, a set of metes and bounds of one or more parcels of land, the geographic area within a predefined radius, and/or other delineation of a closed geographic area. It will be appreciated that the size, shape, and configuration of a bounded geographic region may vary depending on a number of factors, including but not limited to the characteristics of the underlying geography, the configuration of any relevant communications networks, and/or the type or types of unauthorized network access events. In many example implementations, the relevant local area will be defined in a manner that allows for the relevant portions of the network architecture to rapidly and efficiently detect and respond to localized patterns in fraudulent activity.

As used herein, the term "network access rule set" refers to one or more rules that govern the interaction between a user equipment device and the relevant network. For example, in the context of a communications network associated with a financial institution, a network access rule set may include one or more rules that may govern the aspects, characteristics, and/or other parameters associated with transactions and/or other activity that are permissible with respect to a network operated in connection with a financial institution. In particular, the network access rule set may include rules and/or other information designed to enable a user equipment device to detect, block, and/or escalate handling of potentially fraudulent activity.

As noted herein, conventional fraud detection and response systems are increasingly inefficient and/or incapable of rapidly and effectively identifying highly complex and/or otherwise sophisticated fraudulent network access efforts. Some of the inefficiencies and limitations on the capabilities of such systems are inherent in the technical details of the conventional systems, particularly with respect to the challenges imposed by attempting to scale such conventional systems to effectively detect and respond to localize patterns and/or other characteristics of fraudulent activity in a local area. Some of the technical challenges that conventional systems are unable to sufficiently address are driven by the nature of the relevant fraudulent activity. In modern environments, fraudulent activity (and efforts to engage in fraudulent activity) has grown in volume, complexity, variety, and sophistication. In many situations, fraudulent activity is attempted through the coordinated efforts on organized groups of individuals, entities, and/or other actors that are able to use varied and multifaceted techniques to attempt and engage in fraudulent activity. In the context of fraudulent activity intended to attack networks associated with a financial institution, some fraudulent activity takes the form of credit card fraud, wherein credit credentials and/or other information is stolen, synthesized, and/or duplicated. In other instances, fraudulent activity may take the form of illegal activity performed by unscrupulous merchants who pretend to sell legitimate goods or services, but never actually do so. In some instances, so-called fraud rings and/or other coordinated groups involve multiple parties that collude to perpetrate a scam or sham on one or more victims. In some instances, fraudulent activity takes the form of the emulation and/or hijacking of ecommerce sessions. In some instances, insurance scams involve the use of fraudulent insurance products and/or the intentional misuse of legitimate insurance products. The highly varied nature of fraudulent activity (which itself may vary widely in its details and particulars from region to region), often strains the capabilities of conventional fraud detection and response systems, particularly in situations where the slow response time associated with such systems fails to catch fraudulent activity before sophisticate actors change tactics and/or locations.

Additional technical challenges also arise from the methods used by conventional fraud detection and response systems. In particular, many conventional systems focus on the analysis of particular end points associated with individual users, analysis of individual user navigation and behavior, and analysis of potential anomalies in the behavior of an account within a given channel. Such end-point analysis fails to account for broader trends within a region. Such conventional fraud detection and response systems are often incapable of and/or inefficient in detecting fraud rings, the use of false and/or spoofed IP addresses, the use of hijacked devices, the use of synthetic identities and the use of stolen identities. Other fraud detection systems may perform wide-ranging pattern recognition, but many patterns that emerge at a global or national level are not relevant to the devices operating within specific local regions. Example embodiments of the invention described herein address these and other technical challenges by providing a system that can identify point-specific, local, or wide-ranging attempted fraudulent behavior and, through a series of possible escalations, can scope the response to the attempted fraudulent behavior at an appropriate scale.

As shown in FIG. 1A, an example environment 100 is depicted in which some of the technical challenges described herein, and some of the example embodiments described herein that overcome such technical challenges, may be illustrated. In FIG. 1A, example environment 100 is structured into a three-tiered architecture, involving one or more user equipment devices (which are depicted as user equipment devices 102A, 102B, and 102C), one or more local authority controllers (which are depicted as local authority controllers/AIs 104A, 104B, and 104C) with their respective local knowledge bases (which are depicted as local knowledge bases 106A, 106B, and 106C) and a master authority controller/AI 108 with its respective master knowledge base 110. It will be appreciated that while the particular example environment 100 shown in FIG. 1A depicts a relatively small and simplified system for the purposes of clarity, other implementations may involve other configurations. In particular, it will be appreciated that system environments used in connection with some example implementations may involve larger numbers of user devices, local authority controllers and local authority knowledge bases.

In example environment 100, there may be multiple user equipment devices (shown as user equipment devices 102A-102C) through which access to a given network may be achieved. For example, in the context of a communications network used to interact with a financial institution, the user equipment devices may take the form of mobile devices, point-of-sale devices, automated teller machines (ATMs), and/or other devices that are capable of interacting with the network to effect the purchase of goods and/or services, acquire or otherwise transfer funds, and/or otherwise perform transactions and/or information exchanges with a financial institution. In example implementations of example environment 100, each of the user equipment devices 102A-102C is equipped with a thin client that enables each of user equipment devices 102A-102C to communicate and/or otherwise interact with a local authority controller and a local fraud knowledge base, which are shown as local authority controller/AI 104A and local knowledge base 106A in the example arrangement presented FIG. 1A. Local fraud patterns and updates to such local fraud patterns can be pushed (as a network access rule set, for example) from the relevant local knowledge base and local authority controller (shown in FIG. 1A as local knowledge bases 106A and local authority controller/AI 104A) to the thin clients residing on user equipment devices 102A-102C.

When, for example, a transaction is attempted at user equipment device 102A, user equipment device, through operation of its thin client, may attempt to determine whether the subject transaction matches any patterns, signatures, and/or other characteristics of fraudulent activity contained in the network access rule set and/or other information pushed from local authority controller/AI 104A and/or local knowledge base 106A. If user equipment device 102A determines that the transaction is likely to be fraudulent and/or otherwise violates the network access rule set, the user equipment can deny and/or otherwise block the attempted transaction or other activity. Alternatively and/or in addition to denying and/or blocking the activity, the user equipment device 102A may escalate handling of the transaction to the local authority controller 104A, which, through interaction with local knowledge base 106A (and, in some example implementations, interaction with master authority controller 108 and/or master knowledge base 110), can cause instructions (such as through the transmission of an updated network access rule set and/or other instructions, for example) to the user equipment device 102A for use in connection with processing or otherwise responding to the attempted transaction and/or other activity.

As shown in FIG. 1A, each of local authority controllers 104A-104C and local knowledge bases 106A-106C is also in communication with the master fraud knowledge base 110 and the master authority controller 108. While the local knowledge bases 106A-106C and their respective local authority controllers 104A-104C are generally assigned to a local geographic region (such as a zip code, city, state, and/or portions thereof, for example) the master authority controller 108 and the master knowledge base 110 are, in example implementations, configured to interact with all of the local knowledge bases and local authority controllers associated with a given network. Consequently, as the master authority controller 108 and master fraud knowledge base 110 receive reports of fraudulent activity from the local knowledge bases and local authority controllers, the master fraud knowledge base 110 can be updated and information that is relevant on a broad scale can be pushed from the master authority controller 108 for incorporation into network access rule sets and/or other information supplied to the user equipment devices. Similarly, information bubbled up to the authority controller and master fraud knowledge base 110 from one local authority controller 104A and/or local knowledge base 106A can be conveyed to another local authority controller 104B and/or local knowledge base 106B but not necessarily all other local authority controllers or local knowledge bases.

In one example implementation, an individual intent on perpetrating fraudulent activity may attempt to test a fraud detection and response system by making one or more small purchases (such as on the order of less than five dollars, less than twenty dollars and/or less than one hundred dollars, for example) via one or more of user equipment devices 102A-102C, and then making a single, large purchase (such as a purchase at or above one thousand dollars, for example) via one of user equipment devices 102A-102C. Upon detection, this pattern and/or other particular details of the activity could be saved in local knowledge base 106A. This pattern and/or any relevant details of the activity could be pushed (such a via a network access rule set pushed by the local authority controller 104A, for example) to the user equipment devices 102A-102C. As user equipment devices 102A-102C detect similar patterns in subsequent transactions, those transactions may be blocked and contact with law enforcement and/or other entities may be initiated.

In some example implementations, such as when the relevant user equipment device 102A-102C and/or its respective thin client is unsure if a given subsequent transaction is in violation of a network access rule set and/or other set of rules governing subsequent transactions and/or other activity, the detected parameters and/or other aspects of the subsequent activity may be escalated to local authority controller 104A. For example, if an existing network access rule set indicated that large transactions that were preceded by a series of multiple, small transactions should be blocked, user equipment device 102A may escalate a transaction to the local authority controller 104A if a single large transaction was made immediately following a single, small transaction. Regardless of the transaction parameters or details that triggered an escalation, the local authority controller 104A may interact with the local knowledge base 106A to determine how similar transactions have been processed and/or assessed, and provide instructions to the thin client associated with user equipment device 102A accordingly. In some situations, depending on the particulars of the transaction, for example, the local authority controller 104A may also escalate the transaction to request a course of action from the master authority controller 108 and/or the master knowledge base 110. In some such example implementations, in addition to providing instructions to be conveyed to user equipment device 102A, the master authority controller 108 and/or the master knowledge base 110 may push updates to one or more other local authority controllers 104A-104C and/or local knowledge bases 106A-106C for use in connection with similar subsequent transaction patterns.

As noted herein, one of the significant technical challenges involved with conventional fraud detection and response systems (beyond those associated with processing high volumes of transactions) involves rapidly and efficiently developing and deploying network access rule sets and/or other preventative measures that are applicable to the fraudulent activity in a given area while avoiding encumbering system components in other local areas with rule sets that are poorly matched to the fraudulent activity in those other regions. As illustrated in FIG. 1A, the three-tiered architecture described herein overcomes these challenges by allowing many transactions to be handled at the user equipment level (such as via the application of the network access rule set and/or other rules used by a user equipment device and its respective thin client, for example), while transactions that may require further analysis can often be handled at a local level, instead of requiring the intervention of a master or global authority in every instance where a suspect transaction does not fall within the clear bounds of a global rule set.

Figure 1B:
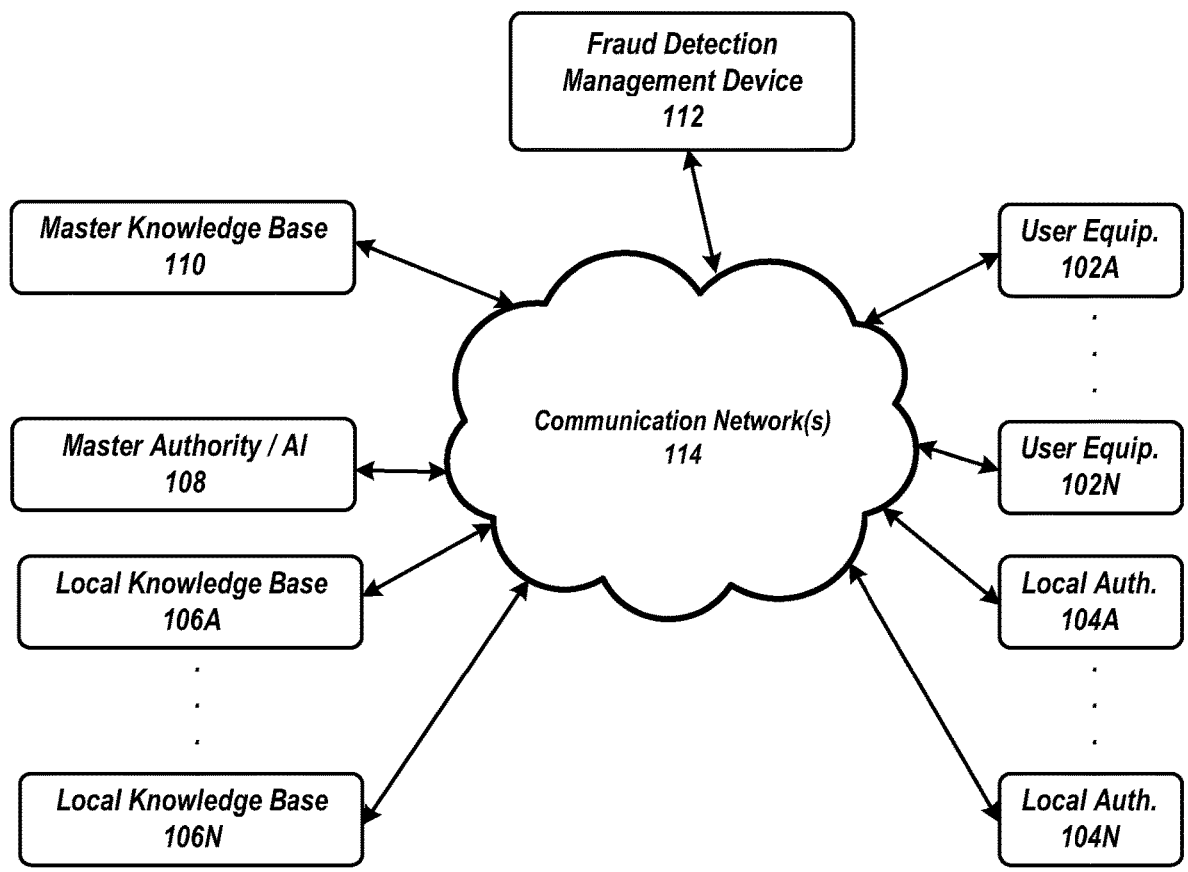
FIG. 1B illustrates another system diagram illustrating network connectivity of a variety of devices that may be involved in some example embodiments described herein.

FIG. 1B illustrates a system diagram of a set of devices within a network environment that may be involved in some example embodiments described herein. In this regard, FIG. 1B discloses an example environment 120 within which embodiments of the present disclosure may operate to detect and respond to attempts to use user equipment devices to engage in fraudulent network access activity. As illustrated, a fraud detection management device 112 may be connected to one or more user equipment devices 102A-102N (which, as described herein with respect to FIG. 1A, for example, may take the form of a network terminal, computer, mobile device, point-of-sale terminal, ATM, or the like, or any of the other types of devices referenced and/or contemplated in connection with the user equipment devices described herein) through one or more communications networks 114. The fraud detection management device 112 may also be connected to one or more local authority controllers 104A-104N and one or more local knowledge bases 106A-106N through one or more communications networks 128. The fraud detection management device 112 may also be connected with the master authority controller 108 and/or the master knowledge base 110 through one or more communication networks 114.

In some embodiments, the fraud detection management device 112 may be configured to facilitate the transmission of network access rule sets from local authority controllers 104A-104N to their respective user equipment devices 102A-102N, facilitate escalation communications from user equipment devices 102A-102N to their local authority controller(s) 104A-104N and/or their local knowledge bases 106A-106N, and/or otherwise facilitate communications between and amongst the relevant user devices 102A-102N, local authority controllers 104A-104N, local knowledge bases 106A-106N, master authority controller 108 and master knowledge base 110.

The fraud detection management device 112 may be embodied as one or more computers or computing systems as known in the art. In some embodiments, the fraud detection management device 112 may provide for receiving and/or providing data objects and/or other data sets to and from various sources, including but not necessarily limited to the user equipment devices 102A-102N, local authority controllers 104A-104N, local knowledge bases 106A-106N, master authority controller 108, and/or master knowledge base 110, or any combination thereof. For example the fraud detection management device 112 may receive data objects and/or data sets associated with fraudulent activity and/or other unauthorized network access events from a user equipment device, such as user equipment device 102A, which may be associated with local authority controller 104A and local knowledge base 106A in FIG. 1A. The fraud detection management device 112 may also provide data objects and/or other data sets, such as a network access rule set, for example, to a user equipment device, such as user equipment device 102A. Such a network access rule set may originate in whole or in part with local authority controller 104A, local knowledge base 106A, master authority controller 108, and/or master knowledge base 110, as described in connection with FIG. 1A. The fraud detection management device 112 may also be configured to communicate with one or more user equipment devices 102A-102N (which may be embodied by any computing device known in the art, including but not limited to laptop computers, smartphones, netbooks, tablet computers, wearable devices, desktop computers, electronic workstations, ATMs, or the like, for example) to provide information about one or more unauthorized network access events and/or one or more network access rule sets.

As shown in FIG. 1B, the fraud detection management device 112, the user equipment devices 102A-102N, the local authority controllers 104A-104N, the local knowledge bases 106A-106N, the master authority controller 108 and the master knowledge base 110 are configured to communicate with each other and otherwise interact with one or more communications networks 114. It will be appreciated that communications networks 114 may take the form of any wired and/or wireless networks suitable for enabling communication between the various devices described herein. In some example implementations, the fraud detection management device 112 and the other components depicted in FIG. 1B interact via a communication network that is associated with a financial institution and/or otherwise configured to facilitate the exchange of information associated with the purchase of goods and/or services, the transfer of funds and/or other resources and/or the performance of one or more transactions. As such, in some of the examples described herein, the network environment 120 depicted in FIG. 1B may be incorporated into and/or supportive of the three-tiered architecture depicted in FIG. 1A to enable devices shown or otherwise contemplated in FIG. 1A to interact with the network environment 120, and for operations performed within the three-tiered architecture of FIG. 1A to be reflected and facilitated in the network environment 120 of FIG. 1B.

Greater detail is provided below regarding certain example embodiments contemplated herein.

Device Architecture

Apparatuses of the present invention may be embodied by any of a variety of devices. For example, an apparatus performing and/or facilitating the improved fraud detection and response afforded by the multi-tiered architecture featuring three or more tiers described herein may include any of a variety of fixed terminals, such a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein (including but not limited to fraud detection management device 112), may have various form factors and designs, but will nevertheless include at least the components illustrated in FIG. 2 and described in connection with example apparatus 200.

Figure 2:
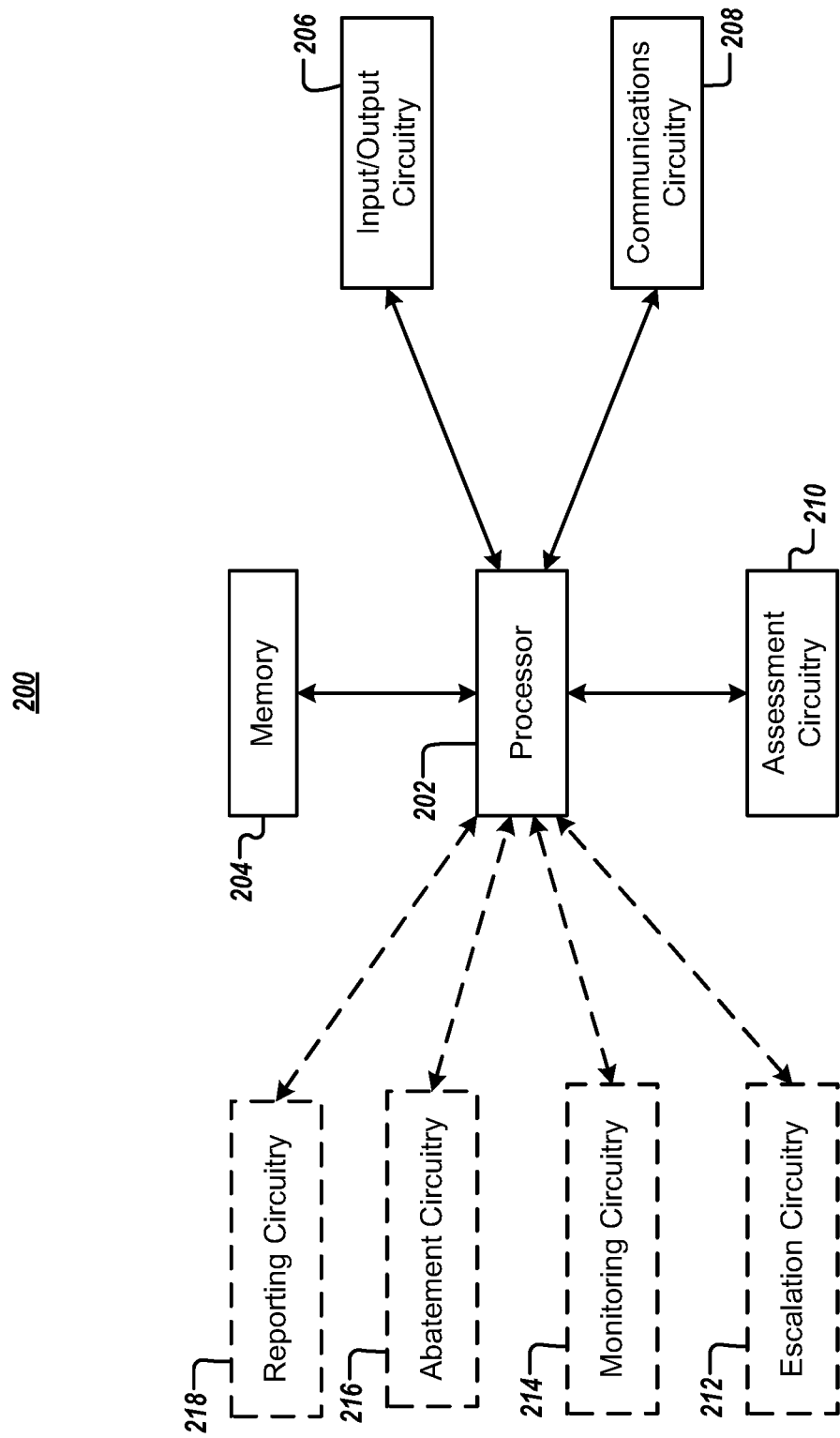
FIG. 2 illustrates a schematic diagram of the components of an example apparatus that may perform operations described herein, in accordance with some example embodiments described herein.

As illustrated in FIG. 2, the apparatus 200 may include a processor 202, a memory 204, input/output circuitry 206, and communications circuitry 208. Moreover, apparatus 200 may include assessment circuitry 210, escalation circuitry 212, monitoring circuitry 214, abatement circuitry 216, and reporting circuitry 218. The apparatus 200 may be configured to execute the operations described below in connection with FIG. 3. Although these components 202-218 are described in some cases using functional language, it should be understood that the particular implementations necessarily include the use of particular hardware. It should also be understood that certain of these components 202-218 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein with respect to components of the apparatus therefore includes particular hardware configured to perform the functions associated with respective circuitry described herein.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the apparatus 200 may provide or supplement the functionality of particular circuitry.

In some embodiments, the processor 202 (and/or coprocessor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor 202. Alternatively or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The apparatus 200 further includes input/output circuitry 206 that may, in turn, be in communication with processor 202 to provide output to the user and to receive input from a user or another source. In this regard, the input/output circuitry may comprise a user interface and/or other interface that allows for the receipt and output of information relating to unauthorized network access events. Separately, the input/output circuitry 206 may comprise a display that may be manipulated by a mobile application. In some embodiments, the input/output circuitry 206 may also include additional functionality keyboard, a mouse, a joystick, a touch screen, touch areas, soft keys, a microphone, a speaker, or other input/output mechanisms. The processor 202 and/or user interface circuitry comprising the processor 202 may be configured to control one or more functions of display through computer program instructions (e.g., software and/or firmware) stored on a memory accessible to the processor (e.g., memory 204, and/or the like), such as to receive and produce data associated with network access events and related geography.

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

Assessment circuitry 210 includes hardware components designed to detect and analyze a transaction, attempted network access, and/or other activity to determine whether the activity matches one or more patterns, signatures, and/or other characteristics contained in a network access rule set and/or other rules aimed at blocking and/or otherwise preventing fraudulent activity within a network. These hardware components may, for instance, utilize elements of input/output circuitry 206 to parse a received transaction, and memory 204 to retrieve a network access rule set and/or other stored set of information relating to one or more types of fraudulent activity and/or other unauthorized network activity. Assessment circuitry 210 may utilize processing circuitry, such as the processor 202, to perform the above operations, and may utilize memory 204 to store collected information.

Escalation circuitry 212 includes hardware components designed to pass information associated with a given transaction and/or other network activity (and, in some instances, a request for further instructions) to an authority controller and/or knowledge base. These hardware components may, for instance, utilize elements of input/output circuitry 206 to detect aspects of a potentially fraudulent transaction, memory 204 to retrieve stored rule sets, including but not limited to information patterns and/or other characteristics of fraudulent transactions, and communications circuitry 208 to cause the relevant information and request to be transmitted to the relevant authority controller and/or knowledge base, and to receive instructions from such relevant authority controller and/or knowledge base. Escalation circuitry 212 may utilize processing circuitry, such as the processor 202, to perform its corresponding operations, and may utilize memory 204 to store collected information. It will be understood that escalation circuitry 214 is illustrated in FIG. 2 as an optional component because escalation circuitry 212 may not be included in every device that may comprise an apparatus 200 (e.g., a master authority controller will not include escalation circuitry 212 because there are no further devices to which handling of a matter may be escalated).

Monitoring circuitry 214 includes hardware components designed to receive, assess, and respond to an escalation received from or more user equipment devices. These hardware components may, for instance, utilize elements of input/output circuitry 206 to receive information regarding one or more escalated transactions, and memory 204 to retrieve information regarding potentially relevant patterns, signatures, and/or other characteristics of fraudulent and/or non-fraudulent transactions. Monitoring circuitry 214 may utilize processing circuitry, such as the processor 202, to perform its corresponding operations, and may utilize memory 204 to store collected information. It will be understood that monitoring circuitry 214 is illustrated in FIG. 2 as an optional component only because monitoring circuitry 214 may not be included in user equipment devices or the thin clients stored therein, even though monitoring circuitry 214 is a necessary component of other devices involved in the multi-tiered system architecture.

Abatement circuitry 216 includes hardware components designed to generate a network access set based on one or more fraudulent transactions and/or one or more patterns, signatures, and/or characteristics of fraudulent and/or otherwise unauthorized activity. These hardware components may, for instance, utilize elements of input/output circuitry 206 to receive real-time information, near-real-time information, and/or other information regarding the fraudulent activity that may be relevant to one or more areas. The hardware components of abatement circuitry 216 may also interact with memory 204 to retrieve information about a one or more authority controllers, knowledge bases, and/or user equipment devices and/or the network access rule sets associated with such devices. Abatement circuitry 216 may utilize processing circuitry, such as the processor 202, to perform the above operations, and may utilize memory 204 to store collected information. It will be understood that abatement circuitry 216 is also illustrated in FIG. 2 as an optional component because abatement circuitry 216 may not be included in user equipment devices or the thin clients stored therein.

Reporting circuitry 218 includes hardware components designed to determine whether information associated with an escalated transaction and/or other event is applicable to user equipment devices, local authority controllers and/or local knowledge bases in multiple areas. These hardware components may, for instance, utilize elements of input/output circuitry 206 and/or communications circuitry 208 to receive one or more data sets from a user equipment device, local authority controller and/or local knowledge base that has previously received information associated with a fraudulent and/or potentially fraudulent transaction that has been escalated for further processing and/or review. The hardware components of reporting circuitry 218 may also interact with memory 204 to retrieve information about a given device and/or transaction, the network access rules associated with the device and/or transaction, and/or responses that may be available to the relevant device. Reporting circuitry 218 may utilize processing circuitry, such as the processor 202, to perform the above operations, and may utilize memory 204 to store collected information. It will be understood that reporting circuitry 218 is also illustrated in FIG. 2 as an optional component because reporting circuitry 218 may not be included in user equipment devices, local authority controllers or local knowledge bases.

It should also be appreciated that, in some embodiments, the assessment circuitry 210, escalation circuitry 212, monitoring circuitry 214, abatement circuitry 216, and reporting circuitry 218 may include a separate processor, specially configured field programmable gate array (FPGA), or application specific interface circuit (ASIC) to perform its corresponding functions.

In addition, computer program instructions and/or other type of code may be loaded onto a computer, processor or other programmable apparatus's circuitry to produce a machine, such that the computer, processor other programmable circuitry that execute the code on the machine create the means for implementing the various functions, including those described in connection with the components of apparatus 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Having described specific components of example apparatuses 200, and in connection with FIGS. 1A, 1B, and 2, an example procedure is described below in connection with FIGS. 3 and 4 for the improved reconfiguration of a network-connected device in response to the detection and mapping of an unauthorized network access event.

Figure 3:
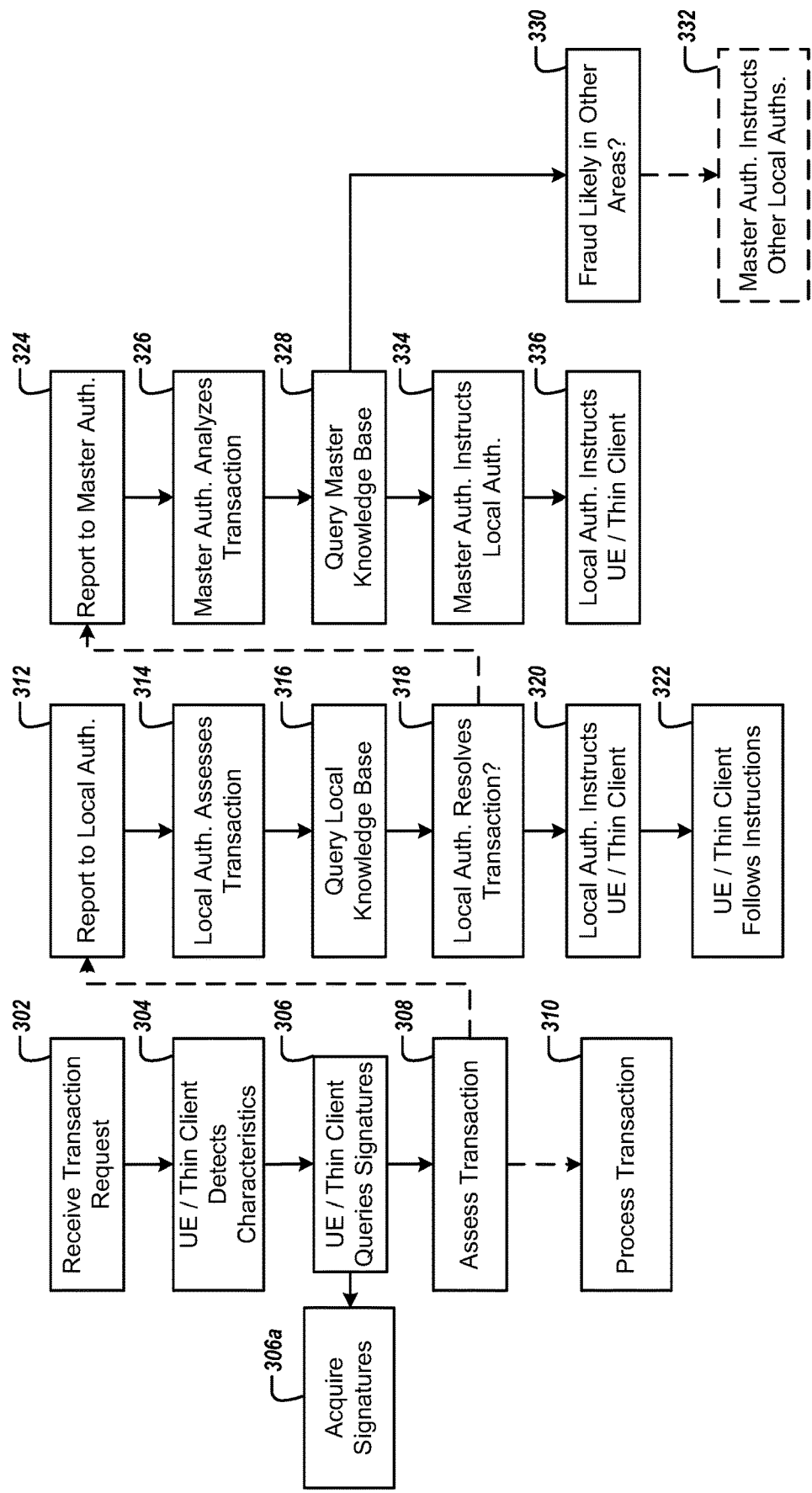
FIG. 3 illustrates a flowchart describing example operations performed by an apparatus to facilitate improved fraud detection and response, in accordance with some example embodiments described herein.

Example Operations for Improved Fraud Detection and Response in a Multi-Tiered Network Architecture Turning to FIG. 3, a flowchart is illustrated that contains operations for using an apparatus to facilitate improved fraud detection and response (such as through the efficient detection of fraudulent transactions, deployment of network access rule sets, and handling of escalation requests, for example) in a multi-tiered network architecture. The operations illustrated in FIG. 3 may, for example, be performed by different devices within a multi-tiered system architecture. For instance, a user equipment device may perform operations 302-312 and 322 of the procedure, while a local authority controller or local knowledge base may perform operations 314-320, 324, and 336 of the procedure, and a master controller or master knowledge base may perform operations 326-334. For ease of description, all of these operations are described in connection with a corresponding apparatus 200 as described above, and more specifically in connection with one or more of the corresponding processor 202, memory 204, input/output circuitry 206, communications circuitry 208, assessment circuitry 210, escalation circuitry 212, monitoring circuitry 214, abatement circuitry 216, and/or reporting circuitry 218. However, reference to an apparatus 200 in connection with one of the operations shown in FIG. 3 does not necessarily mean that the same apparatus 200 is performing another of the operations shown in FIG. 3.

Operation 302 is the first operation in the procedure illustrated in FIG. 3. With respect to operation 302, the apparatus 200 includes means, such as processor 202, memory 204, input/output circuitry 206, communications circuitry 208, assessment circuitry 210, escalation circuitry 212, monitoring circuitry 214, and/or the like, for receiving a transaction request. For example, the transaction request may include a request to make a purchase of goods or services, access funds, and/or otherwise utilize resources managed by or otherwise associated with a financial institution. In example implementations of operation 302, a transaction request is received by a user equipment device configured with a thin client, such as user equipment device 102A, through the operation of communications circuitry 208 and/or input/output circuitry 206 of the apparatus 200.

A transaction request may take any of a number of forms, and may be configured as a structured data object that contains a set of data about a given transaction and the particular details (such as an amount, account identification, user identification, payer and/or payee, or the like, for example) of the transaction. Information associated with and/or underlying the transaction may come from any of one or more of a variety of sources, including but not limited to real-time and/or near-real-time data streams (such a merchants, network operators, and/or other systems associated with a financial institution, and/or other data sources that may provide information in accordance with different time schedules). In some example implementations, real-time and/or near-real-time data streams (such as those that may be available to fraud monitoring systems used by a financial institution and/or other entity, for example) are monitored and/or periodically accessed by the apparatus 200 and/or another system configured to identify information within the data streams that relates to a given transaction and extract such data from the data streams. The extracted data may then be incorporated into a data object or other data set associated with the transaction request for subsequent transmission and processing by the apparatus 200.

After the receipt of the transaction request as described in connection with operation 302 is performed in a given circumstance, the procedure illustrated in FIG. 3 then advances to operation 304. At operation 304, the apparatus 200 includes means, such as assessment circuitry 210 or the like, for detecting the parameters associated with the transaction request. In this regard, assessment circuitry 210 may most commonly comprise circuitry configured to (either independently and/or in conjunction with other aspects of apparatus 200, such as the processor 202, for example) work in connection with a thin client installed on a user equipment device to parse the information associated with a transaction request to identify and determine the characteristics of a transaction that can be evaluated against one or more rules governing transactions performed in connection with a given user equipment device. Upon extraction of the relevant characteristics and/or other parameters of the transaction request, the assessment circuitry 210 of the apparatus 200 may pass the extracted information to the escalation circuitry 212, store the extracted information in memory 204, and/or may otherwise pass the extracted information to other circuitry in apparatus 200 for further processing.

Turning next to operation 306, the apparatus 200 includes means, such as assessment circuitry 210 or the like, for looking up patterns, signatures, and/or other characteristics of a transaction that are associated with fraudulent transaction that may be relevant to a given user equipment device. In this regard, the assessment circuitry 210 may most commonly comprise circuitry configured to (either independently and/or in conjunction with other aspects of apparatus 200, such as the processor 202, for example) work in connection with a thin client installed on a user equipment device to access rules and/or criteria associated with a given thin client and/or user equipment device (such as the rules or criteria supplied by a network access rule set). In some example implementations of operation 306 (and as shown in operation 306A) the apparatus, such as through the operation of the assessment circuitry 210, the processor 202, and/or memory 204, may access and use stored information regarding patterns, signatures, and/or other characteristics of fraudulent activity that may be stored for use by the thin client of a given user equipment device.

As shown at operation 308, the apparatus 200 includes means, such as assessment circuitry 210, for determining if the transaction request reflects an authentic (e.g., benign) transaction or a potentially fraudulent transaction. In some example implementations, assessment circuitry 210 interacts with the processor 202, memory 204, input/output circuitry 206, and/or communications circuitry 208 to determine whether the characteristics of the transaction detected and/or parsed at operation 304, as applied against the information regarding patterns, signatures, and/or other characteristics of fraudulent activity acquired in operation 306, indicate that the transaction request received at operation 302 is likely fraudulent. In some instances, assessment circuitry 210 may test the relevant transaction information against the criteria supplied in a network access rule set and/or other set of criteria supplied by a local authority controller, local knowledge base, master authority controller, and/or master knowledge base to determine whether the transaction is likely authentic or likely fraudulent In instances where the transaction request is deemed to be authentic and/or otherwise non-fraudulent, the transaction is processed normally, as shown in operation 310. In most instances, the processing of an authentic, non-fraudulent transaction will be performed by the relevant user equipment device in connection with other systems that may be operated by and/or otherwise available to a financial institution.

Upon determination by the thin client (such as in connection with the operation of assessment circuitry 210 of the apparatus 200, for example) that the transaction request likely represents fraudulent activity, the process depicted in FIG. 3 may transition to operation 312.

As shown by operation 312, the apparatus 200 includes means, such as escalation circuitry 212, for reporting the transaction to a local authority controller. In some instances, escalation circuitry 212 may interact with the processor 202, memory 204, input/output circuitry 206 and/or communications circuitry 208 to pass information regarding the transaction request received at operation 302 from the thin client and/or its related user equipment device to the relevant local authority controller. As discussed herein, in situations where a thin client and/or a related user equipment device is not able to conclusively determine whether to allow or deny a transaction, it may be advantageous to pass the transaction information to the local authority controller for further assessment. In some example implementations, it may be advantageous for a thin client and/or related user equipment device to pass all or nearly all transaction requests that are identified by the thin client and/or relevant user device as likely fraudulent to the local authority to assist in the development of data sets from which patterns, signatures, and/or other characteristics of fraudulent activity may be determined.

Upon receipt of the report and/or other information regarding a transaction passed from the user equipment device and/or its related thin client to the relevant local authority controller in operation 312, the process depicted in FIG. 3 progresses to operation 314, which is performed by a local authority controller 104. As illustrated in operation 314, the apparatus 200 means, such as communications circuitry 208, input/output circuitry 206, and/or monitoring circuitry 214 for causing the local authority controller to analyze the transaction parameters and/or other transaction information received from the user equipment device and/or its related thin client. In some example implementations, the monitoring circuitry 214 and/or other aspects of the local authority controller feature artificial intelligence circuitry and/or systems capable of detecting and/or analyzing patterns, signatures, and/or other characteristics associated with attempted transactions to ascertain whether a given transaction is likely fraudulent. As shown in operation 316 (which involves the local authority controller 104 contacting the relevant local knowledge base 106), the process depicted in FIG. 3 contemplates that part of the analysis performed by the local authority controller may involve interaction between the local authority controller and the local knowledge base to allow information regarding recent transaction activity to be stored in the local knowledge base and/or for information from the local knowledge base (such as updated information regarding the patterns, signatures, and/or other characteristics of transactions that are likely fraudulent, for example) to be used to inform the analysis of the transaction performed in connection with operation 314. It will be appreciated that the apparatus 200 includes means, such as communications circuitry 208, input/output circuitry 206, and/or monitoring circuitry 214, to facilitate the communication between the local authority controller and the local knowledge base and otherwise perform the actions associated with operation 316.

As discussed here, as part of operations 314 and 316, the transaction information passed from a user equipment device (and/or its associated thin client) is analyzed to determine whether the transaction is likely fraudulent in nature. After the determination is made regarding whether the transaction is likely authentic or likely fraudulent (such as through the operation of the monitoring circuitry 214 and/or other artificial intelligence systems associated with the local authority controller), the process depicted in FIG. 3 progressed to operation 318. As illustrated at operation 318, the apparatus 200 includes means, such as communications circuitry 208, input/output circuitry 206, and/or monitoring circuitry 214 to determine whether the local authority controller is capable of resolving the transaction, such as by determining that the transaction is likely authentic and/or likely fraudulent and by providing to a user equipment device instructions for handling the transaction.

In instances where the relevant local authority controller is capable of resolving the transaction, the process depicted in FIG. 3 progresses to operation 320, where the local authority controller provides an action to the thin client and/or its related user equipment device. In this regard, the apparatus includes means, such as communications circuitry 208, input/output circuitry 206, and/or abatement circuitry 216 for causing instructions to be relayed from the local authority controller to the relevant thin client and/or related user equipment device. In some example implementations, the instructions will take the form of a network access rule set. A network access rule set may include any set of rules governing how a transaction and/or other attempt to access a network should be handled by a user equipment device and/or its related thin client. In some instances, such as when a given transaction is deemed to be likely authentic and/or likely fraudulent, the network access rule set may be relatively simple, and indicate that the transaction should be allowed and/or denied. In other instances, the network access rule set may include additional instructions regarding actions to be performed with one or more transactions, additional patterns, signatures, and/or characteristics of likely fraudulent transactions, and/or other instructions designed to enable the user equipment device to efficiently address the attempted fraudulent activity that the user equipment device is likely to encounter in a given geographic area. For example, a network access rule set may indicate that the class of transactions exhibiting certain characteristics have an increased risk of being fraudulent, and instruct the user equipment device to engage in additional security procedures, such as multi-factor authentication, and/or other techniques to reduce the likelihood that a given transaction is fraudulent. As another example, a network access rule set may indicate that a given set of accounts have been compromised and/or reflect the use of inauthentic, synthetic identities, and should be blocked from the network.

Regardless of the precise content of the network access rule set, the process shown in FIG. 3 contemplates that the user equipment device and/or its related thin client follows the instructions contained in the network access rule set, as shown in operation 322.

Turning back to operation 318, while the local authority controller will likely be capable of handling the majority of issues associated with the transactions escalated to the local authority controller, the process depicted in FIG. 3 contemplates that there may be some transactions and/or aspects of transactions that a local authority controller is not capable of unilaterally handling. For example the characteristics of a given transaction may include some, but not all of the characteristics associated with a fraudulent transaction and/or may be determined (such as by an artificial intelligence system associated with the local authority controller, for example) as being a close call. In other instances, the local authority controller may be instructed to pass information regarding transactions that exhibit certain patterns, signatures, and/or other characteristics to a master authority controller and/or master knowledge base.

Regardless of the reason why a local authority controller may be unable to resolve a given transaction, in instances where the local authority controller is unable to resolve a transaction, the process depicted in FIG. 3 progresses to operation 324, where the local authority controller informs the master authority controller of the transaction. In this regard, the apparatus includes means, such as communications circuitry 208, input/output circuitry 206, and/or reporting circuitry 218 for causing information to be relayed from the local authority controller to the master authority controller (which, like the local authority controller, may feature and/or interact with an artificial intelligence system). It will be appreciated that operation 324 is conceptually similar to operation 312, at least in the sense that information associated with a given transaction and/or group of transaction is passed from one or more components from a lower tier to the next higher tier (such as from a user equipment device to a local authority controller, or from a local authority controller to a master authority controller, for example). Likewise, and similar to operations 314 and 316, the process depicted in FIG. 3 progresses to operation 326 (where the master authority controller analyzes the transaction information received from the local authority controller) and operation 328, where the master authority controller interacts with a master knowledge base to update the knowledge base regarding potentially fraudulent activity and/or receive additional information that may assist in the assessment of a given transaction and the appropriate response. In this regard, the master controller may comprise an apparatus 200 that includes means, such as communications circuitry 208, input/output circuitry 206, and reporting circuitry 218 for performing the actions associated with operations 326 and 328, including but not limited to those actions involved with the master authority controller analyzing transaction information received from a local authority controller and the interaction between a master authority controller and a master knowledge base to assess and store information regarding potentially fraudulent transactions.

After the master authority controller interacts with the master knowledge base and otherwise assesses the relevant transaction information as discussed in connection with operations 324, 326, and 328, the process depicted in FIG. 3 progresses to operation 334, where there master authority controller provides instructions to the local authority controller regarding how the local authority controller should respond. In this regard, the apparatus includes means, such as communications circuitry 208, input/output circuitry 206, reporting circuitry 218, and/or abatement circuitry 216 for causing the master authority controller to provide information, such as a network access rule set, to the local access controller. As shown in operation 336, upon receipt of the network access rule set, the local authority controller instructs the relevant user equipment device(s) and/or related thin client(s), in manner similar to that described in connection with operation 320.

As shown in FIG. 3, the process also involves, as shown at operation 330, determining, by the master authority controller and/or the master knowledge base, whether fraudulent activity identified in the transaction information received by the master authority controller and/or master knowledge base (such as in connection with operation 324, for example) is likely to happen and/or be relevant in geographic areas outside those served by the reporting location authority controller. In this regard, the apparatus includes means, such as communications circuitry 208, input/output circuitry 206, reporting circuitry 218 and/or abatement circuitry 216 for determining if fraudulent activity and/or other attempted network access events are likely to occur and/or impact other geographic areas. In situations where the detected activity is likely to occur elsewhere, the process proceeds to optional operation 332, where the master authority controller updates one or more additional local authority controllers. In this regard, the apparatus 200 includes means, such as communications circuitry 208, input/output circuitry 206, reporting circuitry 218 and/or abatement circuitry 216 for facilitating communication between a master authority controller and one or more additional local authority controllers, such as through the direction of one or more network access rule sets to the relevant additional local authority controllers.

As illustrated herein, the three-tiered architecture reflected in the process depicted in FIG. 3 corresponds with the example systems and architectures presented herein in connection with FIGS. 1A and 1B. These processes, architectures, and systems, address the technical challenges discussed herein by maintaining lower tiers, in the form of user equipment devices equipped with thin client applications, that are capable of handling many transactions at a localized level and escalating transaction that require further assessment to a local authority controller that, through interaction with a local knowledge base, is capable of responding the sorts of potentially fraudulent transactions and/or other unauthorized network access attempts and events that are likely to have an impact in the geographic region covered by the local authority controller. In this regard, example implementations of the invention provide for the rapid and efficient detection and response to the particularized fraud and similar threats in a given region. Moreover, since the local authority controllers and local knowledge bases are in communication with a master authority controller and master knowledgebase, information about fraudulent activity that may have an impact on multiple regions covered by a given system can be rapidly and efficiently passed up to the master controller, processed, and distributed throughout the system, without impairing the ability of user equipment devices and local authority controllers to continue addressing more localized threats unilaterally. Some example implementations will now be discussed herein in connection FIG. 4.

Figure 4:
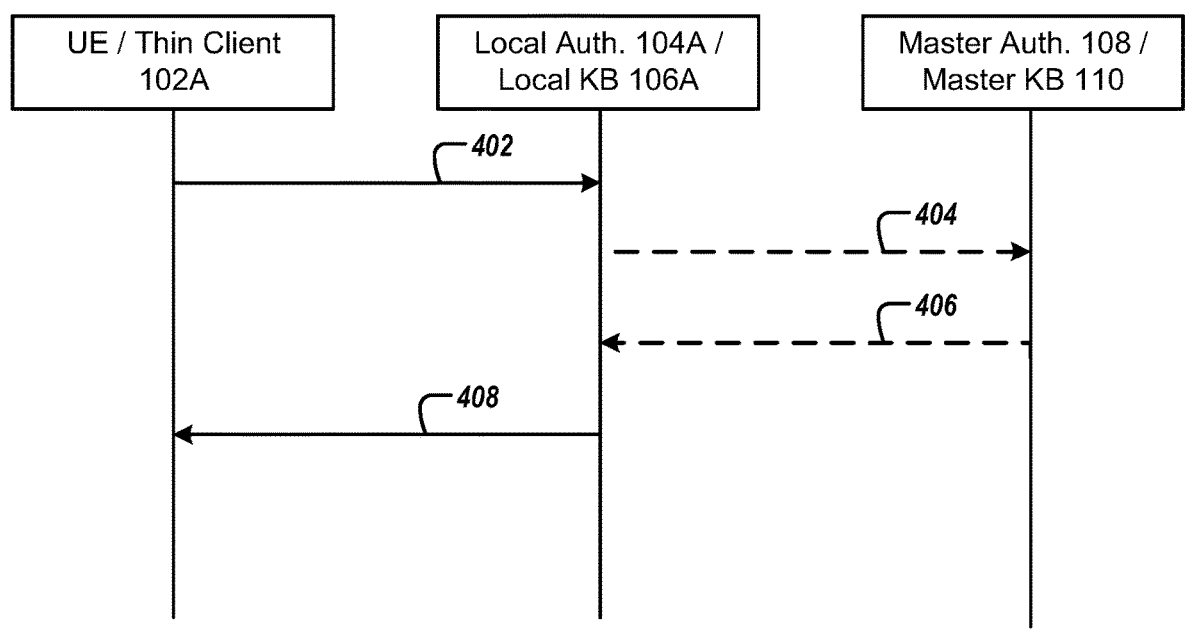
FIG. 4 illustrates a flow diagram describing a sequence of message transmissions between tiers of a multi-tiered system, in accordance with some example embodiments described herein.

FIG. 4 presents a flow diagram depicting the messages and/or other communications passed between system elements at various tiers of the multi-tiered architectures described herein to address various fraudulent transactions and other unauthorized network access events. For ease of explanation, a simplified version of the three-tiered architecture shown in FIG. 1A is used in FIG. 4, which involves communications between a single user equipment device 102A (which corresponds to user equipment device 102A described herein with respect to FIGS. 1A and 1B, for example), a combined local authority controller 104A and local knowledge base 106A (which likewise correspond to the local authority controller 104A and local knowledge base 106A described herein with respect to FIGS. 1A and 1B), and a combined master authority controller 108 and master knowledge base 110 (which correspond to their the master authority controller 108 and master knowledge base 110 described herein with respect to FIGS. 1A and 1B).

As shown in FIG. 4, the interaction between the tiered system elements shown commences with generation and transmission of message 402, which is sent (such as through the operation of escalation circuitry 212 of an apparatus 200 embodying a user equipment device, for example) by the user equipment device 102A to the local authority controller 104A and/or the local knowledge base 106A. In some example implementations, message 402 takes the form of an escalation request from user equipment device 102A. In some such example implementations, the escalation request includes a set of information regarding one or more potentially fraudulent transactions and/or other occurrences experienced by the user equipment device 102A, and may include a set of patterns, signatures, characteristics, and/or other information associated with a given transaction or occurrence.

As discussed herein, in most instances, the local authority controller 104A and local knowledge base 106A will be able to resolve the escalation request contained in message 402 received from the user equipment device 102A. In such situations, the local authority 104A and/or the local knowledge base 106A may respond to the user equipment device 102A (such as through the operation of monitoring circuitry 214 and/or abatement circuitry 216 of the apparatus 200, for example) with message 408. Message 408 typically includes instructions for the user equipment device 102A. In some example implementations, message 408 includes a network access rule set, which may contain a set of instructions governing how the user equipment device 102A should respond to a given transaction, request and/or other occurrence.

In some situations, the local authority controller 104A and/or the local knowledge base 106A may not be able to resolve a given transaction, and/or may determine that characteristics of a given transaction and/or other occurrence warrant further escalation to the master authority controller and/or master knowledge base. As shown in FIG. 4, message 404 may be conveyed in such situations (such as through the operation of monitoring circuitry 214 and/or reporting circuitry 218 of the apparatus 200, for example) from the local authority controller 104A and/or the local knowledge base 106A to the master authority controller 108 and/or the master knowledge base 110 for further processing. Upon completion of any processing performed by the master authority controller 108 and/or master knowledge base 110, message 406 may be conveyed (such as through the operation of reporting circuitry 218, abatement circuitry 216, and/or monitoring circuitry 214 of the apparatus 200, for example) from the master authority controller 108 and/or master knowledge base 110 to the local authority controller 104A and/or the local knowledge base 106A. In situations where message 406 is received by a local authority controller 104A and/or local knowledge base 106A, the content of message 406 (which may include, for example a network access rule set and/or information to be included in a network access rule set) may be incorporated in whole and/or in part into message 408. It will be understood that messages 404 and 406 are optional insofar as they may only be required when a local authority controller 104A is unable to satisfactorily resolve the given transaction.

In one example implementation, user equipment device 102A detects a fraudulent occurrence in the form of a user debit card and PIN number being stolen in a particular store through a spoofing operation. Upon escalation via message 402, the local authority 104A and local knowledge base 106A determine that the threat associated with the detected occurrence is regional in nature, particularly to the extent that dedicated hardware and software is required to further perpetrate the fraudulent occurrence. In response to receipt of the message 402, the local authority controller 104A may alert, via a network access rule set in message 408, all endpoints and/or other user equipment devices in the region served by the local authority controller 104A to watch for similar spoofing efforts and to monitor the activities that appear to be associated with the victimized individual.

In another example implementation, user equipment device 102A detects a fraudulent occurrence in the form of the hacking of a local server that contained certain clients' financial information. Upon escalation via message 402, the local authority 104A and local knowledge base 106A determine that the threat associated with the detected occurrence is regional and potentially national in nature. For example, the breached server may only impact a given region if the attacked server only contained information for clients residing in a given area. The local authority controller 104A may thus inform master knowledge base 110 and master authority controller 108 of the type and nature of the breach via message 404, and the master knowledge base 110 and master authority controller 108 may respond via message 406 to one or more local authority controllers and/or local knowledge bases with a network access rule set that calls for regional servers to be on alert for similar types of breaches and attempted breaches. In response via a network access rule set in message 408, all endpoints and/or other user equipment devices in the region served by the relevant local authority controller 104A are alerted to monitor the activities that appear to be associated with the victimized individuals.

In another example implementation, user equipment device 102A detects a fraudulent occurrence in the form of a large-scale credit card information breach. Upon escalation via message 402, the local authority 104A and local knowledge base 106A determine that the threat associated with the detected occurrence is likely global in nature. The local authority controller 104A may thus inform the master knowledge base 110 and master authority controller 108 immediately of the type and nature of the breach via message 404, and the master knowledge base 110 and master authority controller 108 may respond via message 406 to all local authority controllers and/or local knowledge bases with a network access rule set that calls for regional servers to be on alert for similar types of breaches and attempted breaches, to attempt to secure unbreached storage servers, and to alert all user equipment devices and/or other endpoints of the stolen credit card information In response via a network access rule set in message 408, all endpoints and/or other user equipment devices in the region served by the relevant local authority controller 104A are alerted to the stolen credit card information.

As described herein, example embodiments thus provide many benefits to fraud detection and response systems that have heretofore gone unrealized. Example embodiments described herein provide a multi-tiered fraud detection and response system that efficiently uses localized system components and information to rapidly and effectively detect and respond to the fraudulent activity that may be likely in a given area. In addition, some example embodiments utilize a multi-tiered architecture to rapidly and efficiently pass information across tiers to ensure that information relevant to detecting and addressing fraudulent activity in multiple regions is shared with the relevant system components in the relevant regions.

FIG. 3 and FIG. 4 thus illustrate flowcharts describing the operation of apparatuses, methods, and computer program products according to example embodiments contemplated herein. It will be understood that each block of the flowcharts, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 204 of an apparatus 200 and executed by a processor 202 of the apparatus 200. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for detecting and reducing fraudulent network activity via a system arranged in a three-tiered architecture, the method comprising:
    receiving, by escalation circuitry of a local authority controller, an escalation request from a user equipment device, the escalation request comprising a set of characteristics associated with a potentially fraudulent transaction detected by the user equipment device;
    determining, by monitoring circuitry of the local authority controller and based at least in part on the escalation request, whether the local authority controller is capable of resolving the escalation request, wherein determining whether the local authority controller is capable of resolving the escalation request comprises comparing the set of characteristics associated with the potentially fraudulent transaction against one or more sets of characteristics associated with fraudulent activity received from a local knowledge base, wherein the local knowledge base is configured to store a set of characteristics of one or more fraudulent transactions associated with a particular geographic area;
    in an instance in which the local authority controller is not capable of resolving the escalation request, transmitting, by communications circuitry of the local authority controller, the set of characteristics associated with the potentially fraudulent transaction to a master authority controller;
    receiving, by the communications circuitry of the local authority controller, a set of instructions from the master authority controller in response to transmitting the set of characteristics of the potentially fraudulent transaction to the master authority controller;
    generating, by abatement circuitry of the local authority controller, a network access rule set based on (i) the escalation request and (ii) the set of instructions received from the master authority controller, wherein the network access rule set comprises a set of actions to be taken by the user equipment device based at least in part on the set of characteristics of the potentially fraudulent transaction, wherein the network access rule set is at least indicative of whether the potentially fraudulent transaction is determined to be authentic or fraudulent; and
    causing, by the local authority controller, transmission of the network access rule set to the user equipment device.

2. The method of claim 1, wherein the network access rule set comprises the set of instructions received from the master authority controller.

3. The method of claim 1 further comprising detecting, by assessment circuitry of the local authority controller, the potentially fraudulent transaction to determine the set of characteristics associated with a potentially fraudulent transaction.

4. The method of claim 1, wherein the network access rule set is updated based at least in part on the potentially fraudulent transaction.

5. The method of claim 1, wherein the local authority controller is capable of resolving the escalation request in an instance in which the monitoring circuitry is able to determine that the potentially fraudulent transaction is likely authentic or likely fraudulent.

6. The method of claim 1, wherein the network access rule set indicates that a class of transactions exhibiting certain characteristics has an increased risk of being fraudulent.

7. An apparatus for detecting and reducing fraudulent network activity via a system arranged in a three-tiered architecture, the apparatus comprising a local authority controller including:
    escalation circuitry configured to receive an escalation request from a user equipment device, the escalation request comprising a set of characteristics associated with a potentially fraudulent transaction detected by the user equipment device;
    monitoring circuitry configured to determine, based at least in part on the escalation request, whether the local authority controller is capable of resolving the escalation request, wherein determining whether the local authority controller is capable of resolving the escalation request comprises comparing the set of characteristics associated with the potentially fraudulent transaction against one or more sets of characteristics associated with fraudulent activity received from a local knowledge base, wherein the local knowledge base is configured to store a set of characteristics of one or more fraudulent transactions associated with a particular geographic area;
    communications circuitry configured to:
        in an instance in which the local authority controller is not capable of resolving the escalation request, transmit the set of characteristics associated with the potentially fraudulent transaction to a master authority controller, and
        receive a set of instructions from the master authority controller in response to transmitting the set of characteristics of the potentially fraudulent transaction to the master authority controller; and
    abatement circuitry configured to generate a network access rule set based on (i) the escalation and (ii) the set of instructions received from the master authority controller, wherein the network access rule set comprises a set of actions to be taken by the user equipment device based at least in part on the set of characteristics associated with the potentially fraudulent transaction, and wherein the network access rule set is at least indicative of whether the potentially fraudulent transaction is determined to be authentic or fraudulent,
    wherein the communications circuitry is further configured to cause transmission of the network access rule set to the user equipment device.

8. The apparatus of claim 7, wherein the network access rule set comprises the set of instructions received from the master authority controller.

9. The apparatus of claim 7, further comprising assessment circuitry configured to detect the set of characteristics associated with a potentially fraudulent transaction.

10. The apparatus of claim 7, wherein the network access rule set is updated based at least in part on the potentially fraudulent transaction.

11. The apparatus of claim 7, wherein the local authority controller is capable of resolving the escalation request in an instance in which the monitoring circuitry is able to determine that the potentially fraudulent transaction is likely authentic or likely fraudulent.

12. The apparatus of claim 7, wherein the network access rule set indicates that a class of transactions exhibiting certain characteristics has an increased risk of being fraudulent.

13. A computer program product for detecting and reducing fraudulent network activity via a system arranged in a three-tiered architecture, the computer program product comprising at least one non-transitory computer-readable storage medium storing program instructions that, when executed, cause a local authority controller to:
  receive an escalation request from a user equipment device, the escalation request comprising a set of characteristics associated with a potentially fraudulent transaction detected by the user equipment device;
  determine, based at least in part on the escalation request, whether the local authority controller is capable of resolving the escalation request, wherein determining whether the local authority controller is capable of resolving the escalation request comprises comparing the set of characteristics associated with the potentially fraudulent transaction against one or more sets of characteristics associated with fraudulent activity received from a local knowledge base, wherein the local knowledge base is configured to store a set of characteristics of one or more fraudulent transactions associated with a particular geographic area;
  in an instance in which the local authority controller is not capable of resolving the escalation request, transmit the set of characteristics associated with the potentially fraudulent transaction to a master authority controller;
  receive a set of instructions from the master authority controller in response to transmitting the set of characteristics of the potentially fraudulent transaction to the master authority controller;
  generate a network access rule set based on (i) the escalation request and (ii) the set of instructions received from the master authority controller, wherein the network access rule set comprises a set of actions to be taken by the user equipment device based at least in part on the characteristics associated with the potentially fraudulent transaction, and wherein the network access rule set is at least indicative of whether the potentially fraudulent transaction is determined to be authentic or fraudulent; and
  cause transmission of the network access rule set to the user equipment device.

14. The computer program product of claim 13, wherein the network access rule set comprises the set of instructions received from the master authority controller.

15. The computer program product of claim 13 wherein the program instructions, when executed, further cause the local authority controller to detect the potentially fraudulent transaction to determine the set of characteristics associated with the potentially fraudulent transaction.

16. The computer program product of claim 13, wherein the local authority controller is capable of resolving the escalation request in an instance in which the local authority controller is able to determine that the potentially fraudulent transaction is likely authentic or likely fraudulent.

17. The computer program product of claim 13, wherein the network access rule set indicates that a class of transactions exhibiting certain characteristics has an increased risk of being fraudulent.

* * * * *